United States Patent
Lee

(10) Patent No.: US 11,176,921 B2
(45) Date of Patent: Nov. 16, 2021

(54) SILENCER FOR CLUTCH AIR BOOSTER

(71) Applicants: HYUNDAI MOTOR COMPANY, Seoul (KR); KIA MOTORS CORPORATION, Seoul (KR)

(72) Inventor: Jae-Beom Lee, Jeollabuk-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 486 days.

(21) Appl. No.: 16/201,509

(22) Filed: Nov. 27, 2018

(65) Prior Publication Data

US 2019/0172436 A1 Jun. 6, 2019

(30) Foreign Application Priority Data

Dec. 1, 2017 (KR) .................. 10-2017-0164187

(51) Int. Cl.
*G10K 11/162* (2006.01)
*F16D 48/04* (2006.01)
*G10K 11/16* (2006.01)

(52) U.S. Cl.
CPC ............ *G10K 11/162* (2013.01); *F16D 48/04* (2013.01); *G10K 11/161* (2013.01)

(58) Field of Classification Search
CPC .... G10K 11/162; G10K 11/161; F16D 48/04; B25F 5/00
USPC .................. 181/228, 230, 237, 254, 223
See application file for complete search history.

(56) References Cited

U.S. PATENT DOCUMENTS

| | | | | |
|---|---|---|---|---|
| 3,719,251 A * | 3/1973 | Hedrick | .................. | F01D 15/06 181/230 |
| 4,250,916 A * | 2/1981 | Hoffmann | ............... | F16K 1/126 137/514.5 |
| 4,751,980 A * | 6/1988 | DeVane | ..................... | F01N 1/04 181/224 |
| 5,500,494 A * | 3/1996 | Ligman | .................. | B25D 17/12 181/230 |
| 6,622,819 B2 * | 9/2003 | Reynolds | .............. | F15B 21/008 181/230 |
| 6,668,971 B2 * | 12/2003 | Sterling | .................. | B23B 47/00 181/229 |
| 7,537,084 B2 * | 5/2009 | Buckley | .................. | F01N 1/085 181/212 |
| 7,631,725 B2 * | 12/2009 | Towne | ................ | F04B 39/0055 181/230 |

(Continued)

FOREIGN PATENT DOCUMENTS

| | | |
|---|---|---|
| JP | H11-082547 A | 3/1999 |
| JP | 2000-145822 A | 5/2000 |

(Continued)

*Primary Examiner* — Forrest M Phillips
(74) *Attorney, Agent, or Firm* — Lempia Summerfield Katz LLC

(57) ABSTRACT

A silencer for a clutch air booster may include an exhaust retainer including a disk-shaped bottom portion seated on the upper side of an outlet body of the clutch air booster and a retainer hole formed in the center of the bottom portion, a valve seated on the exhaust retainer to cover the retainer hole, a valve housing coupled to an outer side of the exhaust retainer and forming an inner space configured to accommodate the valve, and a rubber cap coupled to an outer side of the valve housing to cover an upper side of the valve housing.

12 Claims, 4 Drawing Sheets

(56) References Cited

U.S. PATENT DOCUMENTS

| | | |
|---|---|---|
| 10,583,548 B2 * | 3/2020 | Sun ........................ B25C 1/047 |
| 2005/0067218 A1 * | 3/2005 | Bristow ................ F01D 17/105 |
| | | 181/237 |
| 2006/0213719 A1 * | 9/2006 | Schlussler ............... F01N 1/163 |
| | | 181/237 |
| 2006/0249328 A1 * | 11/2006 | Ichikawa .................. F01N 1/10 |
| | | 181/254 |
| 2008/0308348 A1 * | 12/2008 | Bushell .................... F01N 1/10 |
| | | 181/254 |
| 2017/0096919 A1 * | 4/2017 | Imfeld ..................... F23R 3/42 |

FOREIGN PATENT DOCUMENTS

| | | | |
|---|---|---|---|
| KR | 1999-0051672 A | 7/1993 | |
| KR | 10-0407434 B1 | 11/2003 | |

* cited by examiner

SILENCER FOR CLUTCH AIR BOOSTER

CROSS-REFERENCE TO RELATED APPLICATION

This application claims priority to and the benefit of Korean Patent Application No. 10-2017-0164187, filed on Dec. 1, 2017, the entire contents of which are incorporated herein by reference.

FIELD

The present disclosure relates to a silencer applied to a clutch air booster as a clutch boosting device.

BACKGROUND

The statements in this section merely provide background information related to the present disclosure and may not constitute prior art.

A clutch air booster is a clutch boosting device that is similar to a brake booster applied to a large vehicle and that is used to relieve fatigue of a driver, and the present disclosure relates to a silencer for reducing noise by being mounted on the air outlet of such the clutch air booster.

FIG. 1 shows a sectional shape of a conventional silencer for an air booster, and FIG. 2 shows the exploded perspective view.

Referring to FIG. 1 and FIG. 2, in the conventional silencer for the air booster, an exhaust retainer 10 is mounted to an outlet body B of a clutch booster, and a rubber cap 20 is coupled in the form of surrounding the exhaust retainer 10.

On the upper surface of the outlet body B of the clutch booster, a groove is formed to be stepped inwardly, and the exhaust retainer 10 is seated on and coupled to the stepped groove.

The exhaust retainer 10 has a stepped circumference shape and a planar disc shape for coupling, and a retainer hole 11 is formed at the circumference of the disc, so that the air exhausted through the body hole "bh" formed in the outlet body B is exhausted through the retainer hole 11 to the upper side.

The rubber cap 20 is coupled to the outer side of the exhaust retainer 10 with a lid shape having a bottom hole. The bottom hole allows air to be flowed into the inner space and exhausted to the outside through the cap hole 21 formed on the side.

A rubber plate 30 is formed so as to cover the upper surface of the exhaust retainer 10. We have discovered that the air exhausted through the exhaust retainer 10 deforms the rubber plate 30, so that a high pressure (about 5-6 bar) is exhausted through a gap generated by the deformation. In addition, according to the conventional silencer, we have found that the deformed shape of the rubber plate 30 causes a lot of noise such as a flute sound or a trumpet sound.

We believe this is because the clearance (i.e., the gap) formed by the deformed rubber plate 30 is irregular such that it generates various types of noise. This situation varies according to the condition of the assembled rubber plate to block the inflow of dust into the silencer.

Particularly, when some of engine oil is flowed into the compress tank air, the rubber is deformed more and this noise phenomenon occurs more seriously.

SUMMARY

The present disclosure provides a silencer for a clutch air booster capable of enhancing durability without causing noise when exhausting air through the silencer.

According to an exemplary form of the present disclosure, a silencer for a clutch air booster may include: an exhaust retainer including a bottom portion forming a disk shape and seated on an upper side of an outlet body of the clutch air booster and a retainer hole formed in the center of the bottom portion; a valve seated on the exhaust retainer and configured to cover the retainer hole; a valve housing coupled to an outer side of the exhaust retainer and forming an inner space configured to accommodate the valve; and a rubber cap coupled to an outer side of the valve housing and configured to cover an upper side of the valve housing.

Further, the valve may include a lower plate seated on the exhaust retainer; and an exhaust rod extending vertically from the lower plate and being supported by the valve housing.

Furthermore, the exhaust retainer may further include a seat portion protruding and extending from a periphery of the retainer hole toward the upper side of the valve housing; and the lower plate of the valve is seated on the seat portion.

In addition, the lower plate may include an upper disc and a lower disc forming a double disc together; a space in which air flows may be formed between the upper disc and the lower disc; and a valve hole may be formed in the lower disc of the lower plate.

Herein, the valve hole may not be communicated with the retainer hole when the valve is seated on the exhaust retainer.

Additionally, a penetration hole forming an air flow channel communicating with the upper side and a lower side of the valve may be formed inside of the exhaust rod.

On the other hand, the valve housing may include: an upper and lower partition in the form of a disc having a hole through which the exhaust rod penetrates; a lower circumference portion extending downwardly from the upper and lower partition and coupled to the outer side of the exhaust retainer; and an upper circumference portion upwardly extending from the upper and lower partition.

Further, a lower spring disposed between the upper and lower partition and the lower plate may be further included.

Herein, the valve may further include an upper plate extending from an upper end portion of the exhaust rod and an upper spring disposed between the upper and lower partition and the upper plate.

A spring constant of the lower spring may be greater than a spring constant of the upper spring.

Furthermore, a penetration hole communicating with the upper side and the lower side of the valve may be formed inside of the exhaust rod.

Additionally, an exhaust hole may be formed in a side circumference of the rubber cap.

In accordance with a silencer for a clutch air booster according to the exemplary forms of the present disclosure, the rubber plate is removed and the air can be exhausted by the valve, so that it does not generate the conventional noise. In addition, it is able to inhibit or prevent foreign material from flowing into the silencer by the seal structure.

Furthermore, since the spring can control the degree of closing the valve, there is a margin to allow the air to escape sufficiently, and also, it is able to reduce or prevent the valve from receiving impact caused by sudden closing of the valve.

In addition, since air always forms a constant flow through the hole in the valve, friction noise and vibration can be eliminated.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
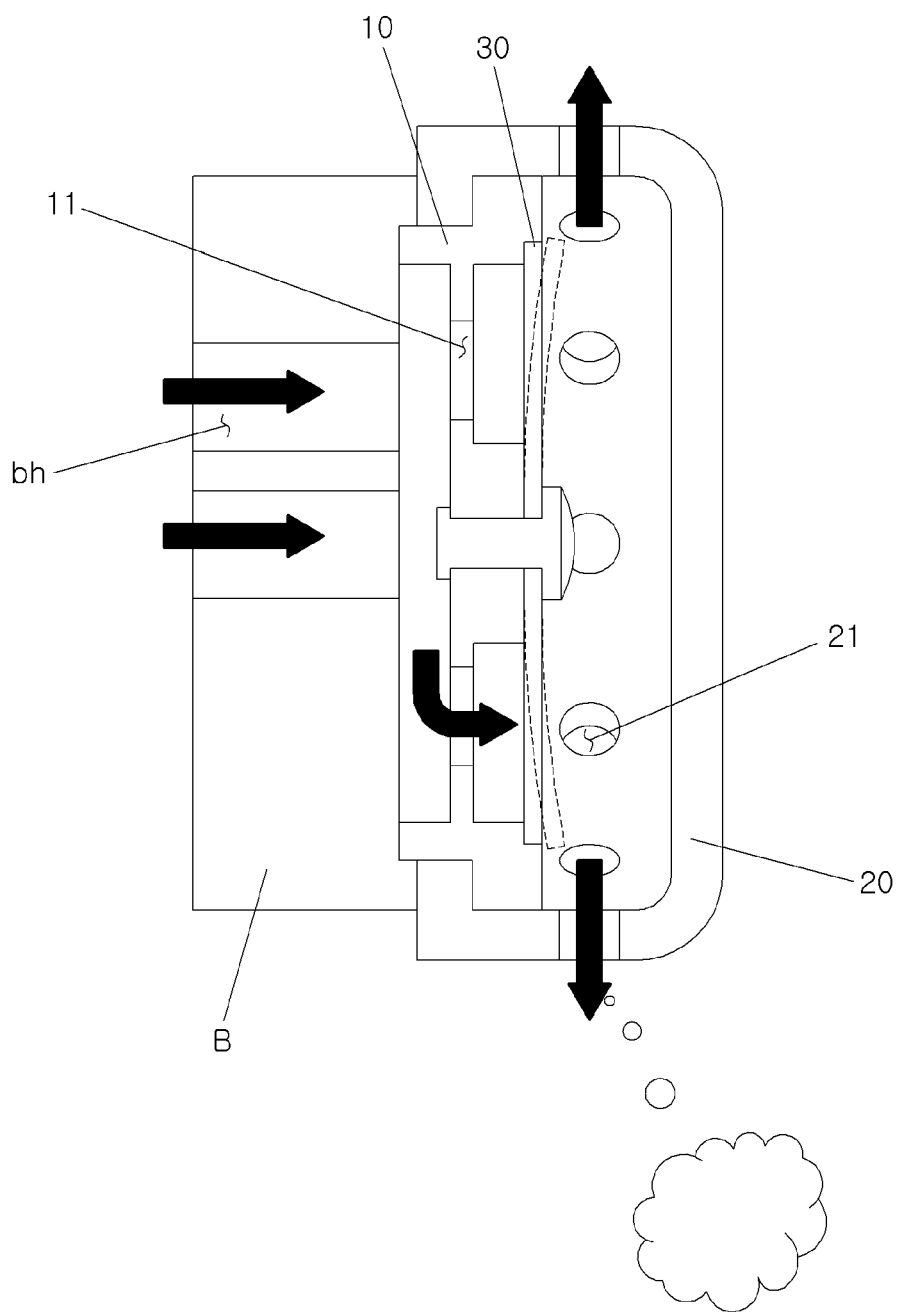
FIG. 1 shows the cross-sectional shape of a conventional silencer for a clutch air booster.
Figure 2:
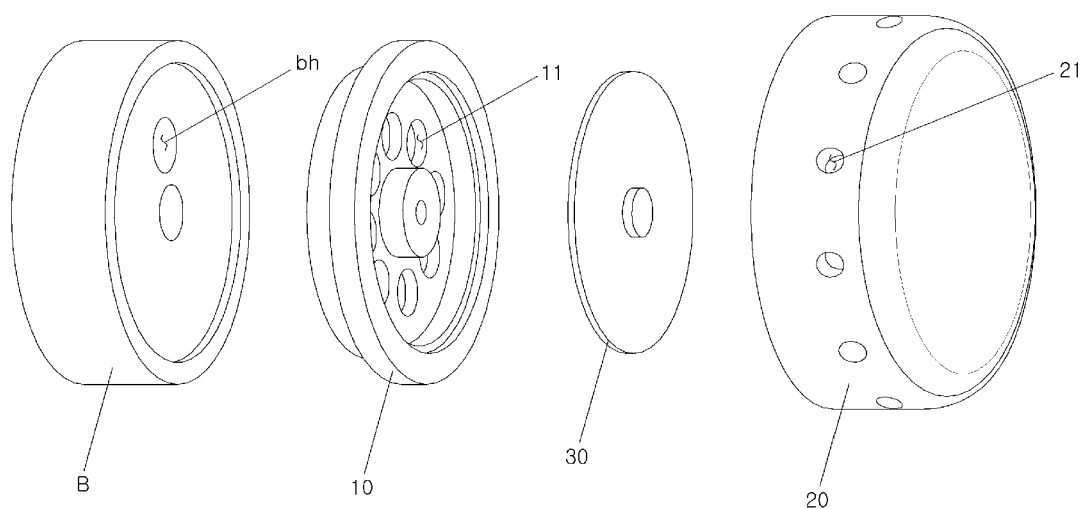
FIG. 2 shows an exploded perspective view of the conventional silencer for the clutch air booster.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to fully understand the present disclosure, the operational advantages of the present disclosure, and the objects attained by the practice of the present disclosure, reference should be made to the appended drawings illustrating the exemplary forms of the present disclosure and the description in the accompanying drawings.

In describing an exemplary form of the present disclosure, known techniques or repetitive descriptions that may unnecessarily obscure the essence of the present disclosure would either reduce or omit the description thereof.

Figure 3:
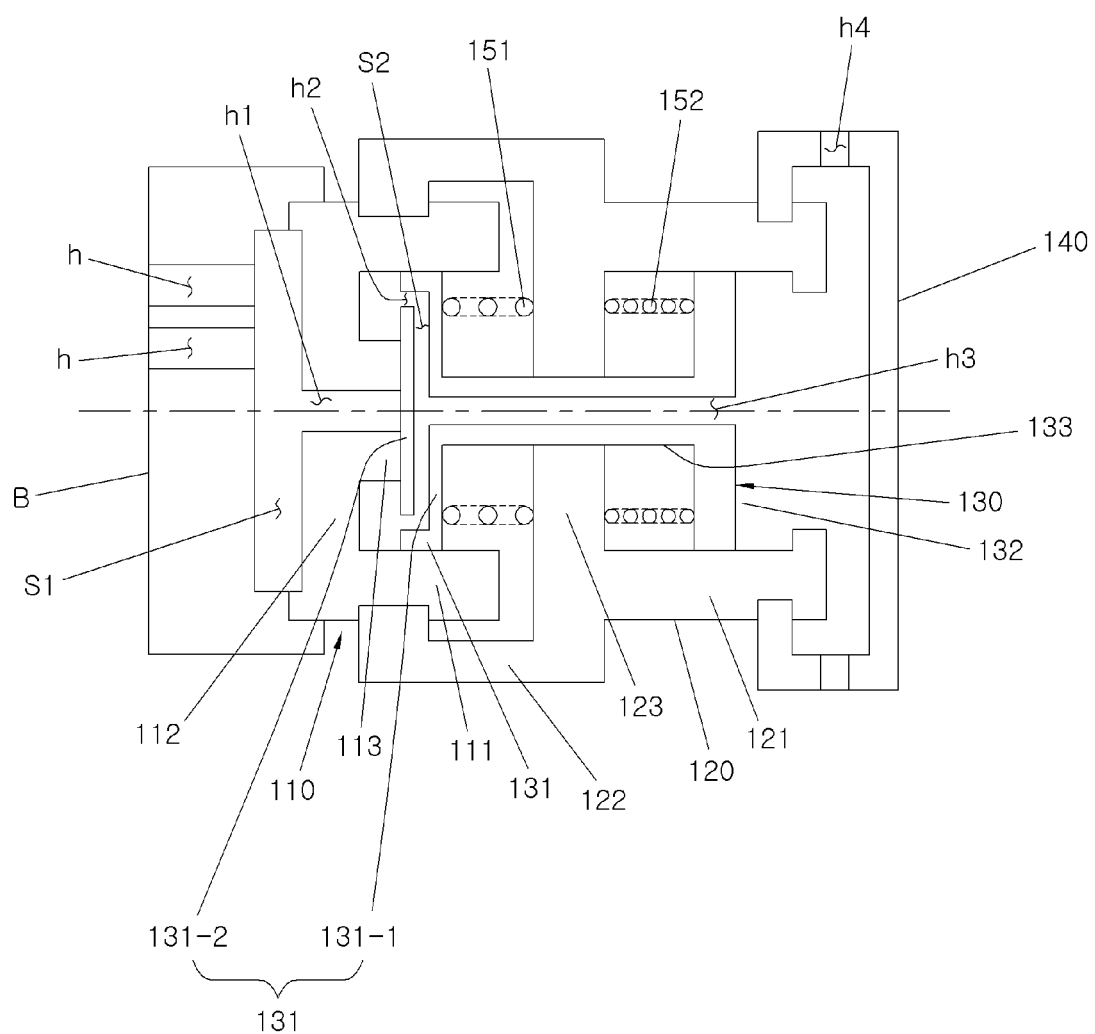
FIG. 3 shows a cross-sectional view of a silencer for a clutch air booster in one form of the present disclosure.

FIG. 3 shows a cross-sectional view of a silencer for a clutch air booster in one form of the present disclosure.

Hereinafter, referring to FIG. 3, a silencer for a clutch air booster will be described in detail.

The silencer for the clutch air booster may be mounted on an outlet body B of a clutch air booster in order to reduce noise caused by the pressure of air exhausted through a body hole "h" formed in the outlet body B and exhaust it to the outside.

The silencer for the clutch air booster by the present disclosure may be a method of exhausting air by applying a valve configuration instead of the way in which the air flowed into the silencer deforms the rubber plate to reduce noise and exhaust air.

An exhaust retainer 110 may be seated and engaged in a stepped groove on the upper surface of the outlet body B.

The exhaust retainer 110 may include a disc-shaped bottom portion 112 having an exterior diameter corresponding to an interior diameter of an upper surface groove formed in the outlet body B and a circumference portion 111 extending vertically upwardly from the circumference of the bottom portion 112 to form a circumference, and the upper surface of the exhaust retainer 110 may be configured in an open form.

Further, a retainer hole h1 may be formed at the center of the bottom portion 112 and a seat portion 113 protruding upwardly from the bottom portion 112 of the retainer hole h1 may be provided.

The seat portion 113 may have a height lower than the height of the circumference portion 111.

One end portion of a valve housing 120 may be coupled to the outer side of the circumference portion 111 of the exhaust retainer 110 and a valve 130 may be seated in the seat portion 113 of the exhaust retainer 110.

The valve housing 120 may include an upper circumference portion 121 and a lower circumference portion 122 having a cylinder shape on the side, and a disk-shaped upper and lower partition 123 may be formed between the upper circumference portion 121 and the lower circumference portion 112.

A rubber cap 140 to be described later may be coupled to the outer side of the upper circumference portion 121, and the lower circumference portion 122 may be coupled to the outer side of the exhaust retainer 110. As the upper and lower partition 123 may be formed therebetween, the upper space and the lower space may be formed in silencer, respectively.

The valve 130 may include a lower plate 131 seated in the seat portion 113 of the exhaust retainer 110, an upper plate 132 disposed in an upper space of the valve housing 120, and an exhaust rod 133 connecting the lower plate 131 and the upper plate 132.

Herein, the exhaust rod 133 may be formed through a hole formed at the center of the upper and lower partition 123 of the valve housing 120.

The lower plate 131 of the valve 130 may be provided in the form of a double disc so that a space S2 through which the air flows between the upper disc 131-1 and the lower disc 131-2 is formed and a valve hole h2 is formed on the lower disc 131-2 so that the air is exhausted to the upper side.

The valve hole h2 may be formed at a portion except for the center of the lower disk so as not to communicate with the retainer hole h1 formed in the seat portion 113 of the exhaust retainer 110.

Furthermore, the rubber cap 140 may be coupled to the outer side of the upper circumference portion 121 of the valve housing 120 and cover and seal the upper surface of the valve housing 120.

In addition, an exhaust hole h4 may be formed along the side circumference to finally exhaust air through an exhaust hole h4.

In the silencer of the present disclosure, the air is exhausted to the upper side of the exhaust retainer 110 while pushes upwardly the valve 130. In order to regulate the exhaust pressure and return the valve 100, a lower spring 151 and an upper spring 152 may be further provided.

The lower spring 151 may be disposed in the lower space of the valve housing 120 and provided between the upper and lower partition 123 of the valve housing 120 and the lower plate 131 of the valve 130.

Further, the upper spring 152 may be disposed in the upper space of the valve housing 120 and provided between the upper and lower partition 123 of the valve housing 120 and the upper plate 132 of the valve 130.

Herein, by making the spring force K1 of the lower spring 151 larger than the spring force K2 of the upper spring 152 and precisely designing the spring force in the narrow space inside the silencer, it is able to finely adjust the degree of opening of the valve.

Furthermore, it is possible to improve noise and durability of the valve by preventing the valve from closing suddenly.

Figure 4:
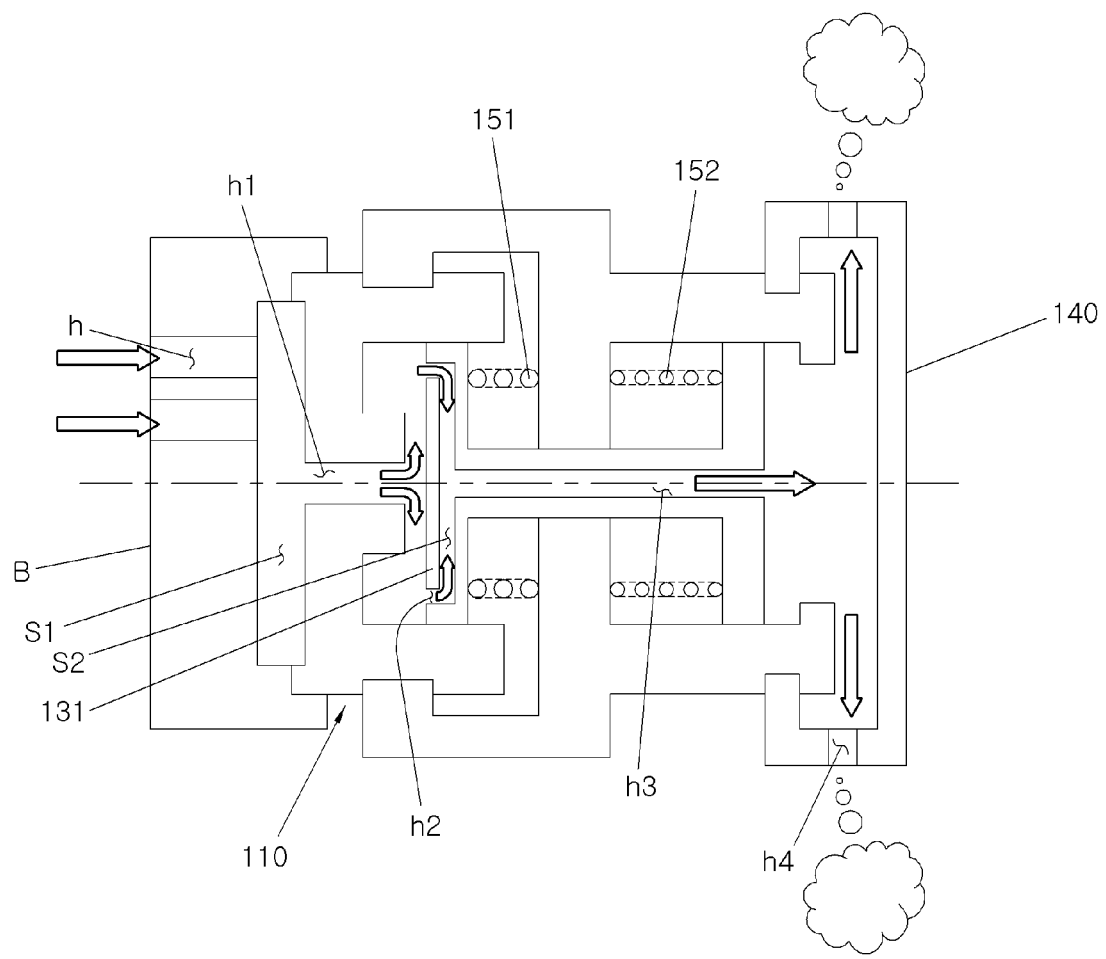
FIG. 4 shows an operation state of the silencer for the clutch air booster in one form of the present disclosure.

Hereinafter, the operation of a silencer for a clutch air booster according to the present disclosure will be described, referring to FIG. 4.

The air is flowed into the space S1 of the upper end groove of the outlet body B through the body hole h formed in the outlet body B of the clutch booster and the inflow air moves along the inside of the portion 113 through the retainer hole h1 formed in the center of the bottom portion 112 of the exhaust retainer 110.

The air flowed into the inner retainer hole h1 inside seat portion 113 pushes upwardly the lower plate 131 of the valve 130 seated in the seat portion 113 while compressing the lower spring 151 and the air is flowed into the inner space of the circumference portion 111 of the exhaust retainer 110 through the gap formed by pushing upwardly the lower plate 131.

At this time, the upper spring 152 is expended.

Then, the air moves upwardly through the valve hole h2 formed in the lower disc 131-2 of the lower plate 131 and through the space S2 between the upper disc 131-1 and the lower disc 131-2 of the lower plate 131 along the penetration hole h3 inside the exhaust rod 133.

The moved air is exhausted to the upper side of the upper plate 132 of the valve 130 and exhausted to the outside through the exhaust hole h4 formed at the circumference and through the space inside the rubber cap 140.

When the air pressure being flowed through the outlet body B becomes insufficient, the lower spring 151 and the upper spring 152 are restored again, so that the valve 130 is seated in the seat portion 113 of the exhaust retainer 110 again.

The valve is closed in the state that the air is not exhausted, so that the inflow of foreign material is blocked from the outside.

In addition, noise due to irregular deformation such as rubber plate does not occur and deformation due to engine oil inflow does not occur also.

This is because the valve is always opened by a predetermined degree by the proper spring force distribution of the lower spring and the upper spring.

Although the present disclosure has been described with reference to the drawings, it will be apparent to those skilled in the art that the disclosure is not limited to the exemplary forms set forth herein but that various modifications and variations can be made therein without departing from the spirit and scope of the present disclosure.

Accordingly, such modifications or exemplary variations should fall within the scope of the present disclosure.

What is claimed is:

1. A silencer for a clutch air booster, comprising:
an exhaust retainer including a bottom portion forming a disk shape and seated on an upper side of an outlet body of the clutch air booster and a retainer hole formed in a center of the bottom portion;
a valve seated on the exhaust retainer and configured to cover the retainer hole;
a valve housing coupled to an outer side of the exhaust retainer; and
a rubber cap coupled to an outer side of the valve housing and configured to cover an upper side of the valve housing,
wherein the valve housing comprises:
an upper circumference portion coupled with the rubber cap;
a lower circumference portion coupled to the outer side of the exhaust retainer, wherein the upper circumference portion and the lower circumference portion are configured to form an inner space configured to accommodate the valve; and
a partition arranged between the upper circumference portion and the lower circumference portion and configured to extend radially inwardly into the inner space, and
wherein the partition is provided with a through hole through which the valve is coupled with the valve housing while resiliently moving within the valve housing so as to adjust a flow of air passing from the exhaust retainer to the rubber cap.

2. The silencer of claim 1, wherein the valve comprises:
an upper plate;
a lower plate seated on the exhaust retainer; and
an exhaust rod extending vertically from the lower plate to the upper plate and being slidably supported by the partition of the valve housing.

3. The silencer of claim 2, wherein:
the exhaust retainer further comprises a seat portion protruding and extending from a periphery of the retainer hole toward the upper side of the valve housing; and
the lower plate of the valve is seated on the seat portion.

4. The silencer of claim 2, wherein:
the lower plate is in a form of a double disc including an upper disc and a lower disc;
a space in which air flows is formed between the upper disc and the lower disc; and
a valve hole is formed in the lower disc of the lower plate.

5. The silencer of claim 4, wherein the valve hole is not communicated with the retainer hole when the valve is seated on the exhaust retainer.

6. The silencer of claim 5, wherein a penetration hole forming an air flow channel communicating with an upper side and a lower side of the valve is formed inside of the exhaust rod.

7. The silencer of claim 2, wherein:
the lower circumference portion extends downwardly from the partition and is coupled to the outer side of the exhaust retainer; and
wherein the upper circumference portion upwardly extends from the partition.

8. The silencer of claim 7, further comprising a lower spring disposed between the partition and the lower plate of the valve.

9. The silencer of claim 8, wherein the upper plate of the valve extends from an upper end portion of the exhaust rod and an upper spring is disposed between the partition and the upper plate.

10. The silencer of claim 9, wherein a spring constant of the lower spring is greater than a spring constant of the upper spring.

11. The silencer of claim 10, wherein a penetration hole forming an air flow channel communicating with an upper side and a lower side of the valve is formed inside of the exhaust rod.

12. The silencer of claim 11, wherein an exhaust hole is formed in a side circumference of the rubber cap.

* * * * *